United States Patent [19]
Fujita et al.

[11] Patent Number: 5,150,920
[45] Date of Patent: Sep. 29, 1992

[54] STEERING WHEEL

[75] Inventors: Yoshiyuki Fujita; Katsunobu Sakane, both of Aichi, Japan

[73] Assignee: Toyoda Gosei Co., Ltd., Nishikasugai, Japan

[21] Appl. No.: 717,796

[22] Filed: Jun. 19, 1991

[30] Foreign Application Priority Data

Jul. 9, 1990 [JP] Japan ................................. 2-181075

[51] Int. Cl.⁵ .............................................. B62D 1/11
[52] U.S. Cl. .................................... 280/777; 280/750; 74/552
[58] Field of Search ................... 280/777, 750; 74/552, 74/558

[56] References Cited

U.S. PATENT DOCUMENTS

| | | | |
|---|---|---|---|
| 2,784,006 | 3/1957 | Dye et al. | 280/750 |
| 2,866,357 | 12/1958 | Houghtaling | 280/750 X |
| 2,946,869 | 7/1960 | Parks et al. | 280/750 X |
| 3,189,367 | 6/1965 | Glass | 280/750 |
| 3,619,525 | 11/1971 | Sjoberg, Jr. | 200/61.55 |
| 3,774,932 | 11/1973 | Schiesterl | 280/777 |
| 3,901,091 | 8/1975 | Wenninger | 74/552 |
| 4,098,525 | 7/1978 | Schwanz et al. | 280/750 |
| 4,200,309 | 4/1980 | Korn et al. | 280/750 |
| 4,353,266 | 10/1982 | Grothe | 74/552 |
| 4,386,538 | 6/1983 | Van Wicklin, Jr. | 74/552 |
| 4,879,923 | 11/1989 | Nagata | 280/750 X |
| 4,962,947 | 10/1990 | Nagata et al. | 280/777 |

FOREIGN PATENT DOCUMENTS

| | | | |
|---|---|---|---|
| 0002074 | 5/1979 | European Pat. Off. | |
| 2251791 | 4/1974 | Fed. Rep. of Germany | |
| 3817883 | 12/1988 | Fed. Rep. of Germany | |
| 3839411 | 7/1989 | Fed. Rep. of Germany | |
| 1272581 | 8/1961 | France | 74/552 |
| 0053561 | 3/1983 | Japan | 74/552 |
| 61-75372 | 5/1986 | Japan | |
| 761342 | 9/1980 | U.S.S.R. | 280/777 |
| 2068314 | 8/1981 | United Kingdom | |

Primary Examiner—Charles A. Marmor
Assistant Examiner—Tamara L. Graysay
Attorney, Agent, or Firm—Cushman, Darby & Cushman

[57] ABSTRACT

A steering wheel having a covering layer integrally formed by connecting covering layers of the spoke members above the boss member and having an energy absorbing member embedded in the covering layer. One end of the energy absorbing member is fixed to the spoke core of the spoke member which extends to the left from the boss plate of the boss member ring core of the ring member. The other end of the energy absorbing member is fixed to the spoke core of the spoke member which extends to the right from the boss plate of the boss member to the ring core of the ring member. The center portion of the energy absorbing member is disposed between the right and left spoke cores.

4 Claims, 3 Drawing Sheets

STEERING WHEEL

BACKGROUND OF THE INVENTION

The present invention relates to steering wheels. More particularly, the present invention relates to a steering wheel comprising a ring member connected by spoke members to a boss member wherein a covering layer is integrally formed over at least a portion of the spoke members and the ring member and has an energy absorbing member embedded therein.

An example of a conventional steering wheel WO, which is disclosed in Japanese Unexamined Utility Model Publication No. 61-75372, is illustrated in FIGS. 3 and 4. The steering wheel WO comprises a boss member (B), a ring member (R) provided around the outer periphery of the boss member, spoke members (S1, S2, S3) connecting the boss member to the ring member, and a pad member (P) mounted on the boss member. Each of the spoke members includes a spoke core member (SC). A covering layer (C), made from a urethane resin, covers the outer periphery of parts of the spoke core members and the outer periphery of the entire ring member. In addition, an energy absorbing apparatus (EAA) made of a metal is disposed within a pad compartment of the pad member.

In the conventional steering wheel WO, the pad cover of the pad member is not formed integrally with the covering layer of the spoke members. Therefore, boundary lines are visible between the pad cover and the covering layer. The boundary line is a deficiency in that design.

In order to avoid that design deficiency, it would be desirable to provide a steering wheel in which a cover layer which covers the right spoke member is integrally connected to a covering layer which covers the left spoke member.

In order to achieve that object, the inventors proposed providing a covering layer for the right spoke member which is integrally formed with the covering layer for the left spoke member by connecting these layers at a point above the boss member. However, they found that it is very difficult to maintain a predetermined configuration of the connected portion of the covering layers at the point above the boss member. Further, the connected portion of the covering layers makes the space for the pad member smaller as compared to the conventional steering wheel, so that the pad member must be smaller. Consequently, the energy absorption of the energy absorbing member is reduced. This presents a significant problem.

SUMMARY OF THE INVENTION

It is an object of the invention to solve the aforementioned problems. Thus, it is an object of the present invention to provide a steering wheel which can provide a good, desirable design without decreasing the energy absorption capability.

A steering wheel provided in accordance with the present invention is characterized by comprising a covering layer integrally formed by connecting covering layers of the spoke members above the boss member and having an energy absorbing member embedded in the covering layer. One end of the energy absorbing member is fixed to the left spoke core of the spoke members which extends to the left from the boss plate of the boss member to the ring core of the ring member. The other end of the energy absorbing member is fixed to the right spoke core of the spoke member which extends to the right of the boss plate of the boss member to the ring core of the ring member. The center portion of the energy absorbing member is generally disposed above the boss plate.

The steering wheel according to the present invention comprises a covering layer which is integrally formed by connecting covering layers of spoke members above the boss member and incorporates an energy absorbing member, so that a predetermined configuration of the connected portion of the covering layers can be maintained by the energy absorbing member. Accordingly, a steering wheel having an advantageous design can be obtained due to the fact that no boundary lines exist on the covering layer of the steering wheel. In addition, impact energy is absorbed with the energy absorbing member embedded in the connected portion of the covering layer. Accordingly, even if the pad member for receiving the energy absorbing apparatus is smaller than in conventional steering wheels, the energy absorption capability can be augmented by the energy absorbing member embedded in the cover layer. As a result, the energy absorption capability of the steering wheel according to the present invention is not lower than that of the conventional steering wheel.

DETAILED DESCRIPTION OF THE PRESENTLY PREFERRED EXEMPLARY EMBODIMENT

A steering wheel provided in accordance with the present invention has an energy absorbing member 2 which is provided at a center portion between the right spoke core S2 the left spoke core S1 of the steering wheel core 1.

Figure 1:
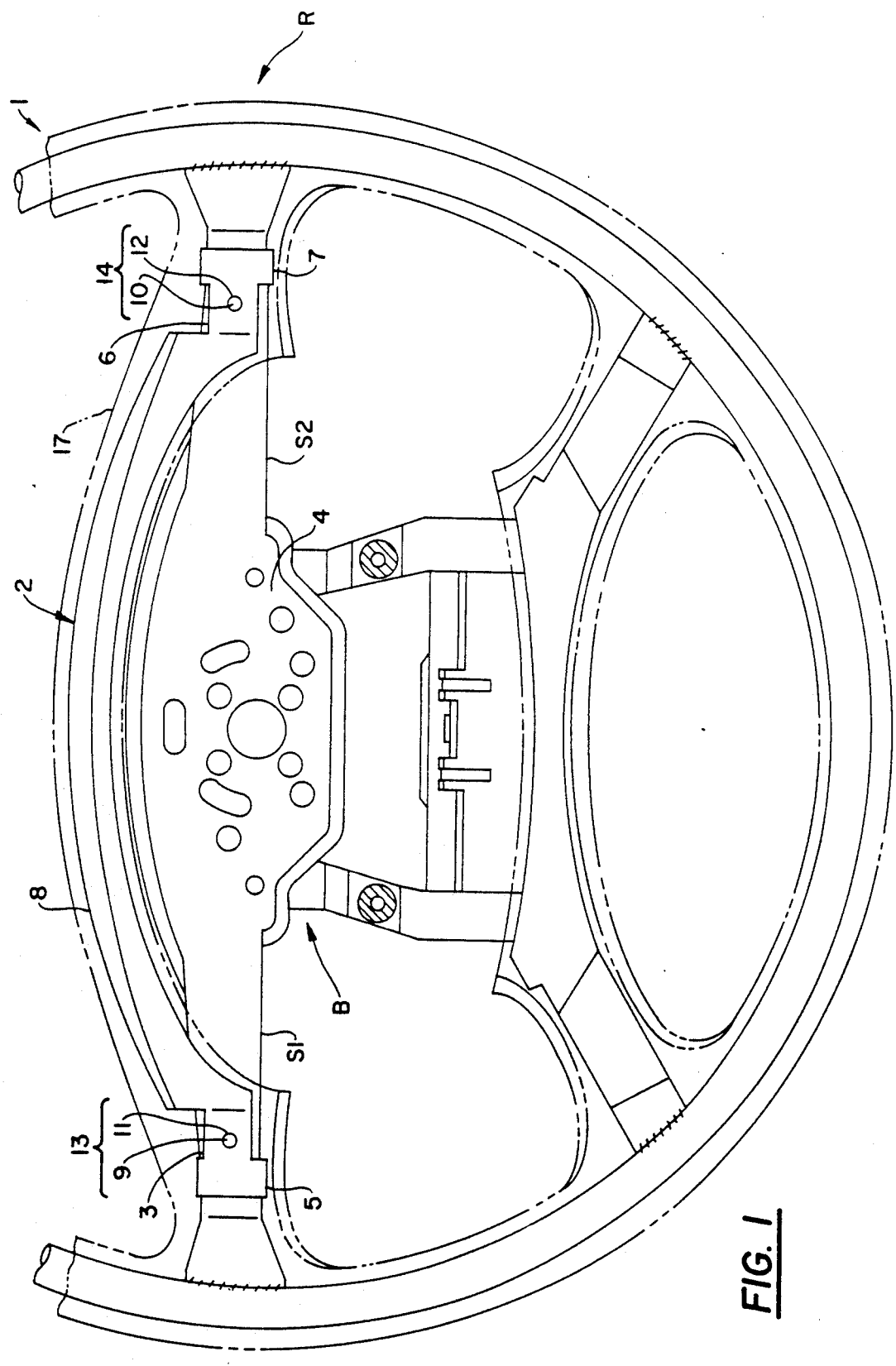
FIG. 1 is a plan view showing a main portion of one embodiment of a steering wheel according to the present invention.
Figure 2:
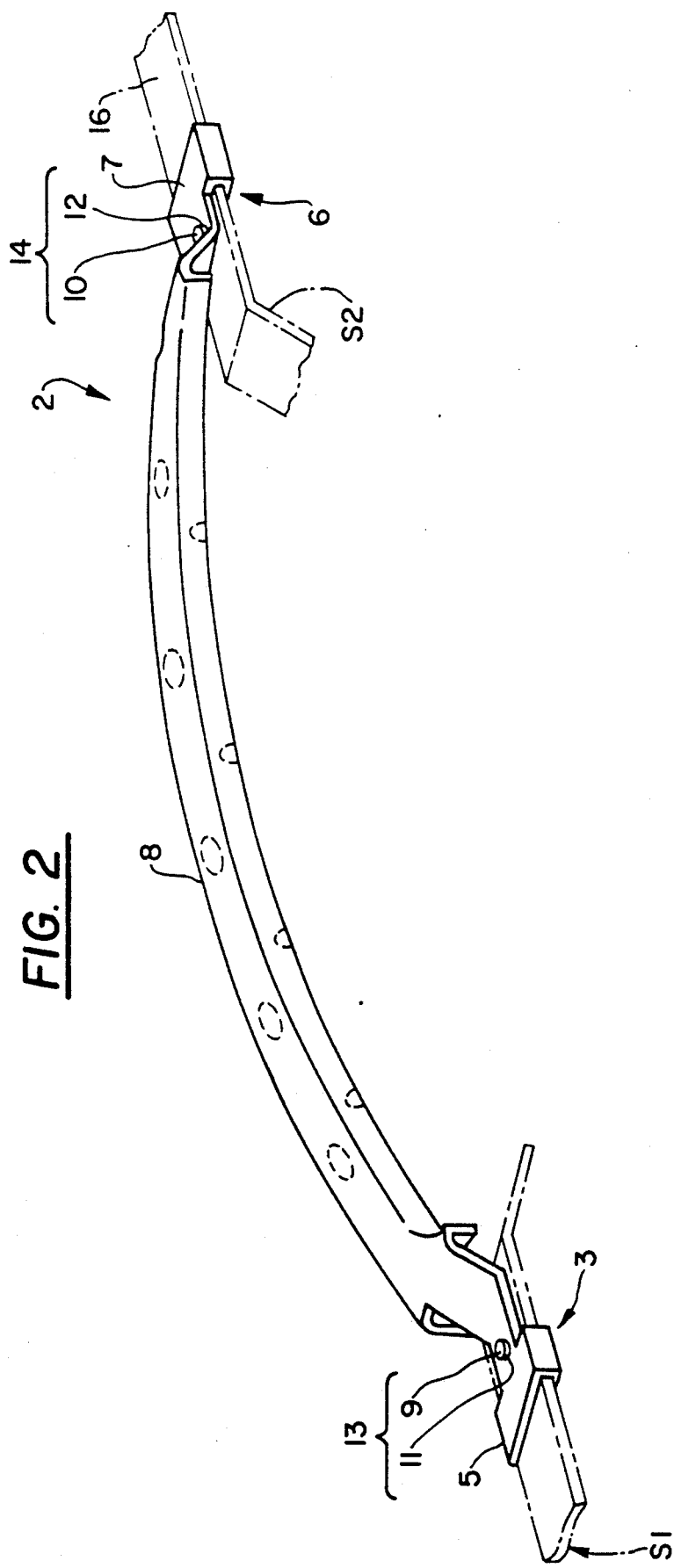
FIG. 2 is a perspective view of an energy absorbing member of the steering wheel of Fig. I.
Figure 3:
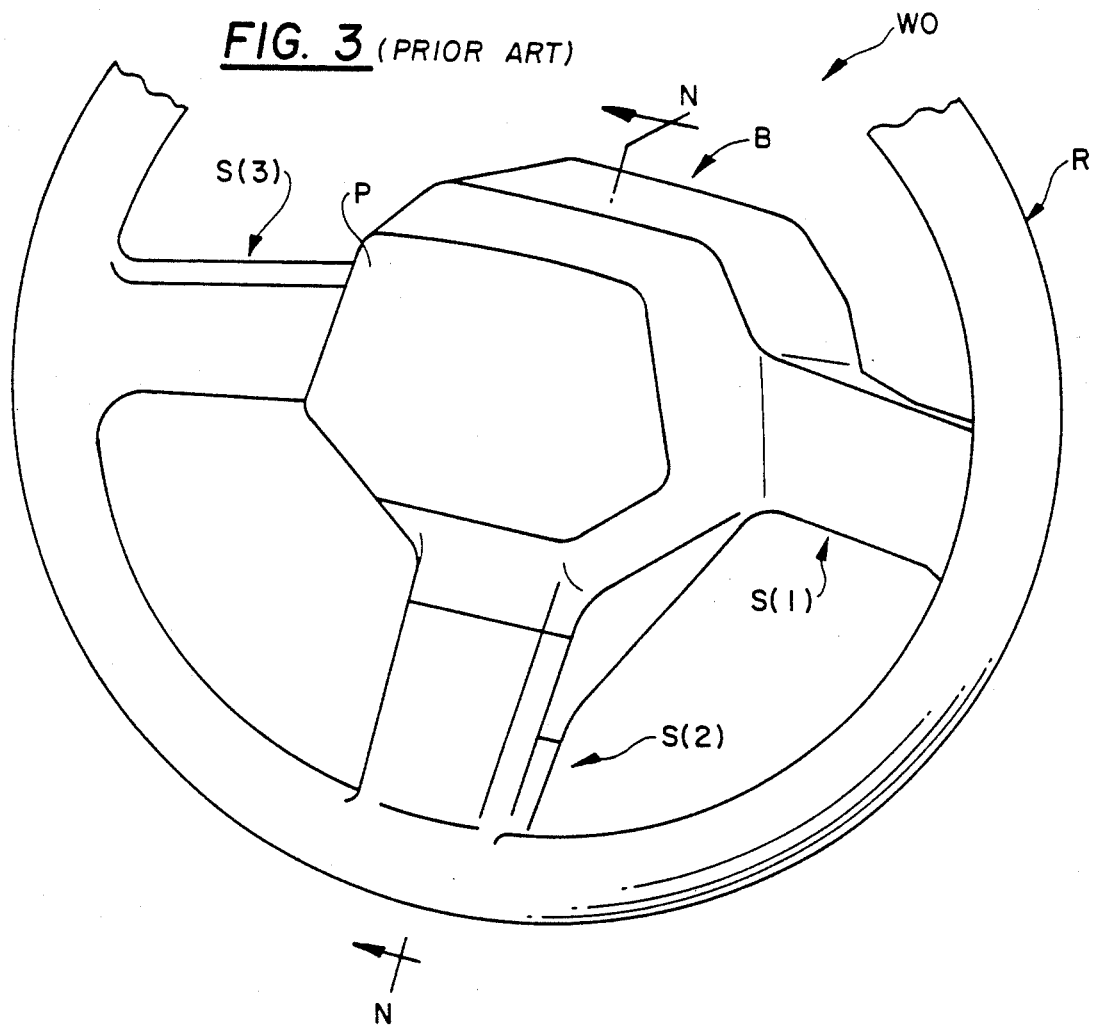
FIG. 3 is a perspective view of a conventional steering wheel.
Figure 4:
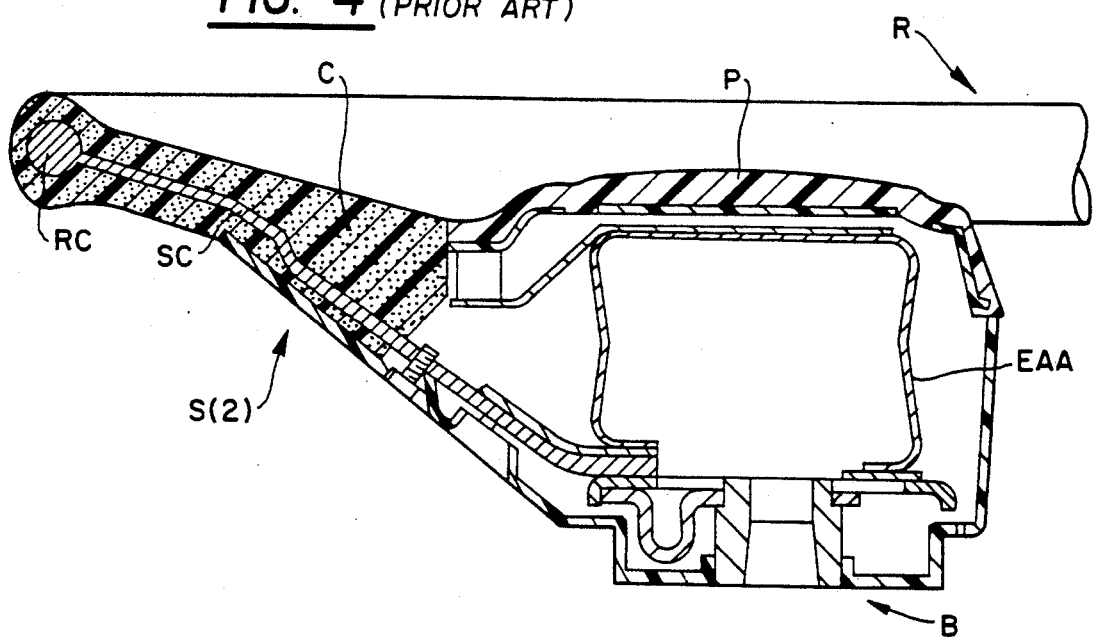
FIG. 4 is a cross-sectional view taken along lines IV—IV of the FIG. 3.

The energy absorbing member 2 is made from a metal plate which has been bent into a U-shape. As shown in Figs. 1 and 2, the energy absorbing member 2 extends between the left spoke core SI and the right spoke core S2, so that the configuration of the entire energy absorbing member 2 is that of a bridge. As shown in the left hand portion of FIG. 1, a mounting portion 5 adapted to be fixed to the left spoke core S1 by caulking is formed at a left end portion 3 of the energy absorbing member 2. The left spoke core S1 extends to the left from a boss plate 4 of the boss member B to a ring core of the ring member R. In addition, as shown in the right hand portion of FIG. 1, a mounting portion 7 adapted to be fixed to the right spoke core S2 by caulking is formed at a right end portion 6 of the energy absorbing member 2. The right spoke core S2 extends to the right from the boss plate 4 of the boss member B to the ring core of the ring member R. As clearly shown in Figs. 1 and 2, a center portion 8 of the energy absorbing member 2 is located substantially at a position above the boss plate 4. When the center portion 8 of the energy absorbing member 2 is subjected to an impact force, the energy absorbing member 2 is deformed so that the U-shaped cross-section of the energy absorbing member 2 is opened and the energy absorbing member 2 is bent in a downward direction. Thus, the energy of impact can be absorbed by deformation of the energy absorbing member 2.

Coupling members 13 and 14 interconnect the left end portion 3 and the right end portion 6 of the energy absorbing member 2 respectively to the left spoke core S1 and the right spoke core S2. In the illustrated embodiment, coupling member 13 includes a recessed portion 11 in the left end portion 3 for receiving a projecting portion 9 formed on the left spoke core Sl. However, the projecting portion 9 could be provided on the left end portion 3 and the recessed portion 11 in the left spoke core Sl. Further, in the illustrated embodiment, coupling member 14 includes a recessed portion 12 in the right end portion 6 for receiving a projecting portion 10 formed on the right spoke core S2. However, the recessed portion 12 could be provided in the right spoke core S2 and the projecting portion 10 on the right end portion 6. Coupling members 13 and 14 position the energy absorbing member 2 with respect to the spoke cores S1 and S2 when they are assembled, and prevent the energy absorbing member 2 from shifting in the longitudinal direction with respect to the spoke cores Sl and S2 after assembly.

The left and right spoke cores Sl and S2 are respectively fixed to a ring core of the ring member R and a boss of the boss member B by welding or the like. Reference numeral 17 designates a covering layer 17, made from an urethane resin, for covering a part of the spoke member S and the entire ring member R.

A method of manufacturing the above-described embodiment of the present invention will now be described with reference to the drawings.

The energy absorbing member 2 is mounted on the steering wheel core 1. The energy absorbing member 2 and the steering wheel core 1 thus assembled are set on a predetermined molding die. In order to form the covering layer 17, circumferences of the steering core 1 and the energy absorbing member 2 are injection-molded.

A sub-standard covering layer is occasionally formed because blow hole (foam) is sometimes generated in a part of the covering layer 17 during injection. If so, the sub-standard covering layer 17 is removed from the steering wheel core 1 and the steering wheel core 1 is reset on the predetermined molding die so that the injection molding can be repeated. Recycling the steering wheel core 1 advantageously saves the material of the steering wheel core 1.

Contrary to the present invention, when the energy absorbing member 2 is fixed to the steering wheel core 1 by a fixing process such as a welding, it is very difficult to completely remove the covering layer 17 from the steering wheel member 1 because small clearances are respectively formed between the spoke cores Sl, S2 and the both ends of the energy absorbing member 2. Accordingly, it is difficult to remove a substandard covering layer.

The removal of a sub-standard covering layer 17 from the structure of the present invention will now be described. Both ends 3 and 5 of energy absorbing member 2 are respectively coupled to the spoke cores Sl and S2 by caulking, so that the caulking therebetween can be easily removed by forcefully pulling the covering layer 17 together with the energy absorbing member 2 upwardly. In this manner, the energy absorbing member 2 can be easily removed from the spoke cores SI and S2 of the steering wheel 1. Removal of the sub-standard covering layer 17 which is formed on each of the energy absorbing member 2 and the steering wheel core 1 can be conducted once the energy absorbing member 2 and the steering wheel core 1 have been disassembled, so that the removing operation can be easily carried out. After the cover removing operation, another energy absorbing member 2 is mounted on the steering wheel core 1 and the assembly is repositioned in the molding die so that the covering layer can be formed by injection molding Accordingly, a satisfactory steering wheel can be obtained by reusing the steering wheel core 1.

In accordance with the present invention, the configuration of the connecting portion of the covering layer 17 is maintained by the energy absorbing member 2 so that the covering layers are integrally formed at a point above the boss member. No boundary line appeared between those covering layers, so that a steering wheel having an advantageous design is obtained with the structure of the invention. In addition, an energy absorbing function above the boss member is provided with the energy absorbing member 2. Accordingly, even if the pad member is reduced in size, the steering wheel as a whole can absorb at least the same energy as can be absorbed with a conventional steering wheel. Further, the energy absorbing member 2 is coupled with the spoke member Sl and S2 of steering wheel member I by caulking, so that the energy absorbing member can be easily removed from the steering wheel core 1. Therefore, if a sub-standard covering layer 17 is molded, it can be easily removed from the steering wheel core I and the energy absorbing member 2.

Furthermore, as shown in FIG. 2, the energy absorbing member 2 can be formed with a predetermined hole(s) or a predetermined slit(s) (shown in phantom), so that the energy absorption of the energy absorbing member 2 is adjustable.

While a preferred embodiment of the invention has been described, it is to be understood that various changes and modifications may be made to the structure thereof without departing from the invention, and all such changes and modifications are limited only by the appended claims.

What is claimed is:

1. A steering wheel comprising:
   a boss member;
   a ring member provided in surrounding relation to said boss member;
   a pair of spoke members connecting said boss member to said ring member;
   an energy absorbing means for absorbing energy of an impact force subjected thereto, said energy absorbing means having first and second ends, said first end being fixed to one of said spoke members of said pair which extends in a first direction from said boss member to said ring member, said second end being fixed to the other one of said spoke members of said pair which extends in a second direction from said boss member to said ring member, said energy absorbing member being laterally offset from said boss member; and
   a cover layer continuously and integrally covering said energy absorbing means, said ring member and at least a portion of said spoke members such that said boss member remains uncovered by said covering layer and thus is exposed.

2. A steering wheel according to claim 1, wherein said energy absorbing means comprises a U-shaped metal plate.

3. A steering wheel according to claim 1, wherein said energy absorbing means defines a bridge between said one spoke member of said pair and the other spoke member of said pair so that a configuration of the entire energy absorbing means is that of a bridge.

4. A steering wheel according to claim 1, wherein said energy absorbing means includes holes defined therethrough for adjusting the energy absorption capability thereof.

* * * * *